(12) United States Patent
Hebrard

(10) Patent No.: US 11,989,604 B2
(45) Date of Patent: May 21, 2024

(54) CORKSCREW WITH CONFIRMATION OF OPENING OF AN AUTHENTICATED BOTTLE

(71) Applicant: U'WINE, Bordeaux (FR)

(72) Inventor: Thomas Hebrard, Bordeaux (FR)

(73) Assignee: U'WINE (FR)

( * ) Notice: Subject to any disclaimer, the term of this patent is extended or adjusted under 35 U.S.C. 154(b) by 165 days.

(21) Appl. No.: 17/753,112

(22) PCT Filed: Aug. 20, 2020

(86) PCT No.: PCT/FR2020/051490
§ 371 (c)(1),
(2) Date: Feb. 18, 2022

(87) PCT Pub. No.: WO2021/032932
PCT Pub. Date: Feb. 25, 2021

(65) Prior Publication Data
US 2022/0292322 A1 Sep. 15, 2022

(30) Foreign Application Priority Data

Aug. 21, 2019 (FR) ........ 1909316

(51) Int. Cl.
*H04Q 5/22* (2006.01)
*B67B 7/04* (2006.01)
*G06K 19/07* (2006.01)
*H04W 4/80* (2018.01)

(52) U.S. Cl.
CPC ......... *G06K 19/0723* (2013.01); *B67B 7/04* (2013.01); *H04W 4/80* (2018.02)

(58) Field of Classification Search
CPC ....... G06K 19/0723; H04W 4/80; B67B 7/04
USPC ..................................... 340/10.1
See application file for complete search history.

(56) References Cited

U.S. PATENT DOCUMENTS

| | | | |
|---|---|---|---|
| 2003/0095253 A1* | 5/2003 | Chow | B65D 55/028 356/240.1 |
| 2009/0277306 A1* | 11/2009 | Elwell | B67B 7/14 81/3.4 |
| 2010/0206136 A1* | 8/2010 | Cheung | B67B 7/0405 81/3.2 |
| 2014/0360971 A1* | 12/2014 | Marino | B65D 81/2038 215/260 |
| 2017/0043989 A1* | 2/2017 | Kwak | B67B 7/0441 |
| 2017/0076568 A1* | 3/2017 | Glamuzina, Jr. | G06Q 30/018 |
| 2017/0129664 A1* | 5/2017 | Hatamian | B65D 39/0064 |
| 2017/0183135 A1* | 6/2017 | Pic | B65D 39/0011 |
| 2018/0215599 A1* | 8/2018 | Mills | B67B 7/0405 |
| 2018/0222614 A1* | 8/2018 | Kagramanyan | B67B 7/0405 |
| 2018/0251356 A1* | 9/2018 | Maroney | B67B 7/04 |
| 2019/0234805 A1* | 8/2019 | Lauchnor | G01K 1/14 |

FOREIGN PATENT DOCUMENTS

| | | |
|---|---|---|
| EP | 1072555 | 1/2001 |
| EP | 2218676 | 8/2020 |

OTHER PUBLICATIONS

International search report for PCT/FR2020/051490 dated Jan. 14, 2021.

* cited by examiner

*Primary Examiner* — Naomi J Small
(74) *Attorney, Agent, or Firm* — Perman & Green, LLP

(57) ABSTRACT

A corkscrew includes a detection assembly configured to detect that a cork has been extracted from the neck of a bottle and thus guarantee that said bottle has actually been opened. Advantageously, this corkscrew is equipped with a reader device to read a security device associated with the bottle that is to be opened, uniquely authenticate this bottle, and provide stock control thereof. Also provided is an assembly including such a corkscrew and a charging base powering the battery of this corkscrew, this base being able to includes a reader device for reading security devices of a plurality of bottles positioned in its area of coverage so as to provide stock control of a cellar.

14 Claims, 3 Drawing Sheets

[Fig. 1]
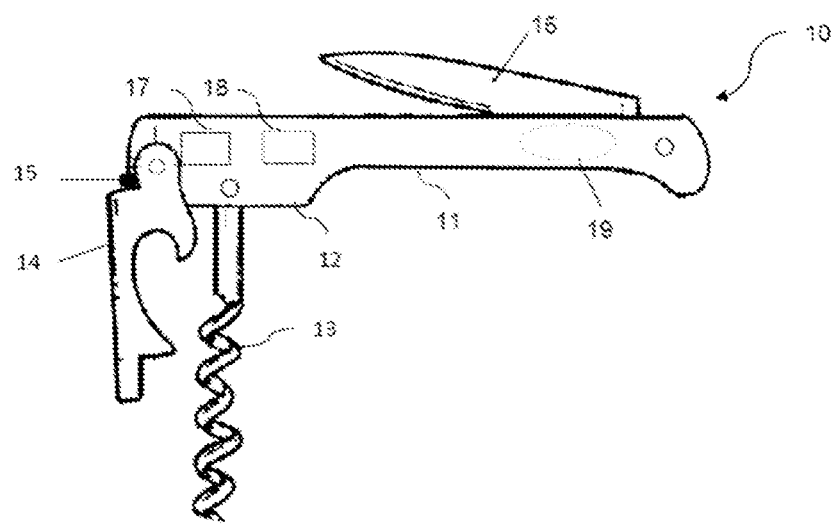
[Fig. 2]
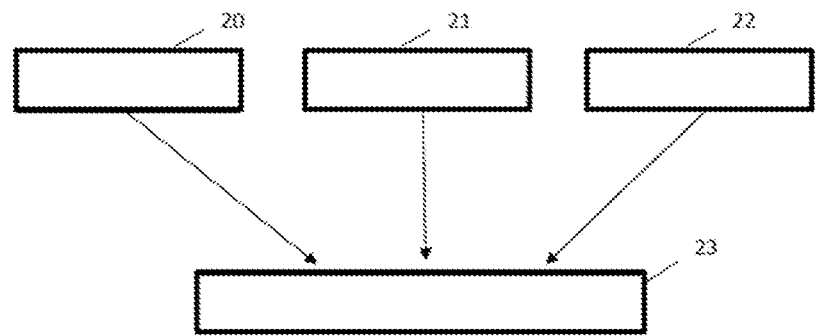

[Fig. 3]
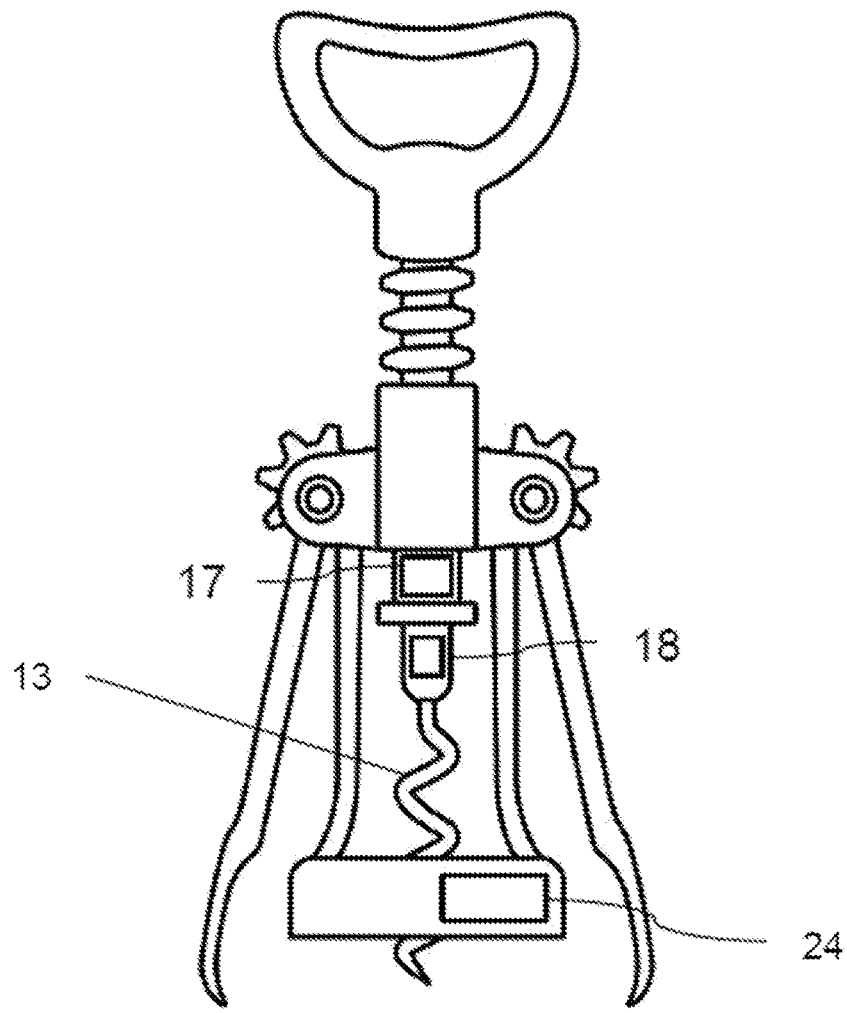
[Fig. 4]
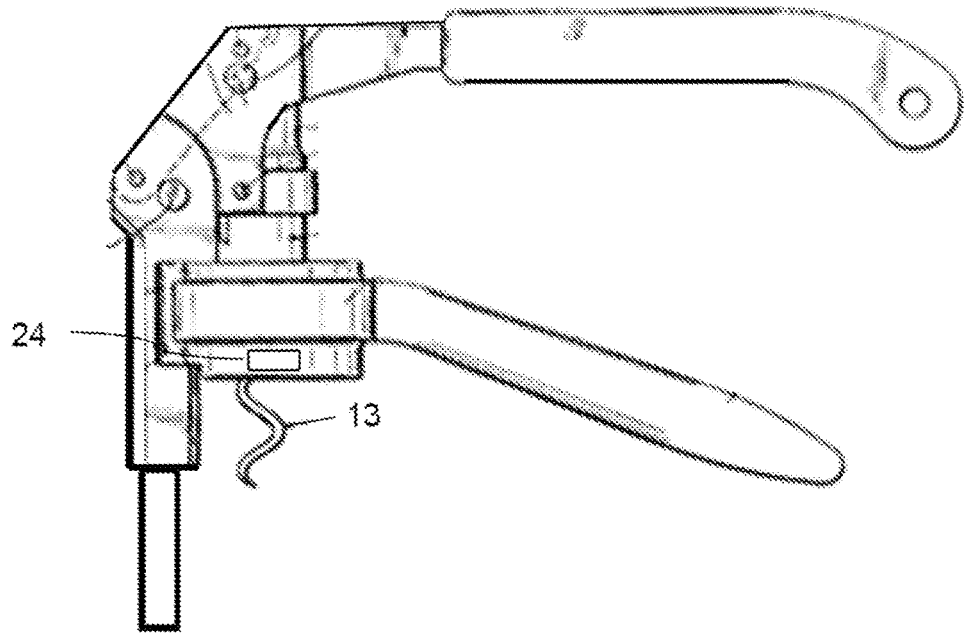

[Fig. 5]
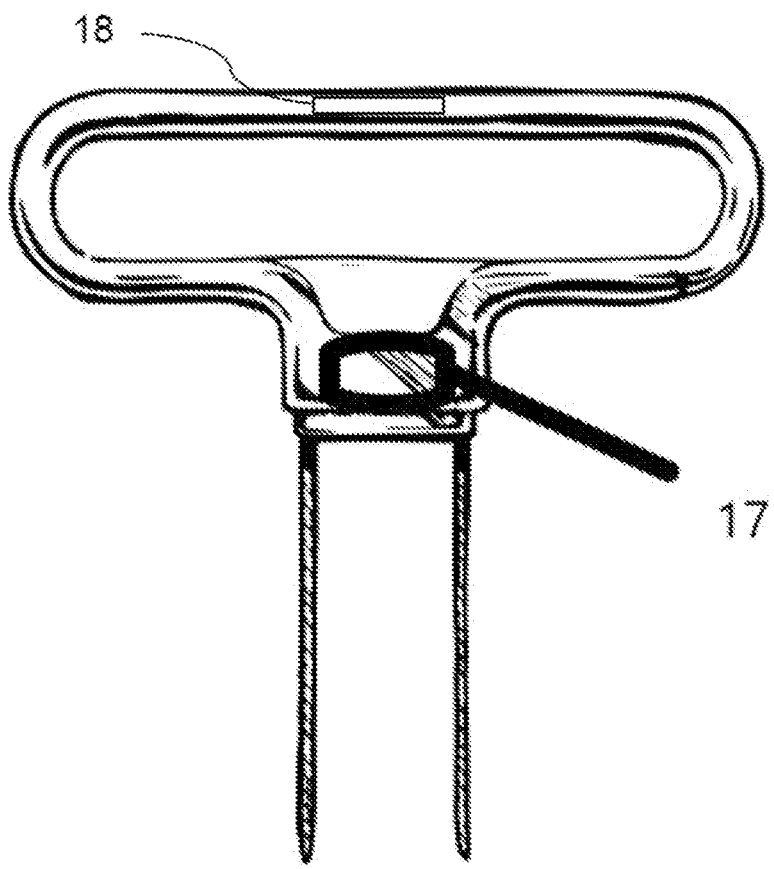
[Fig. 6]
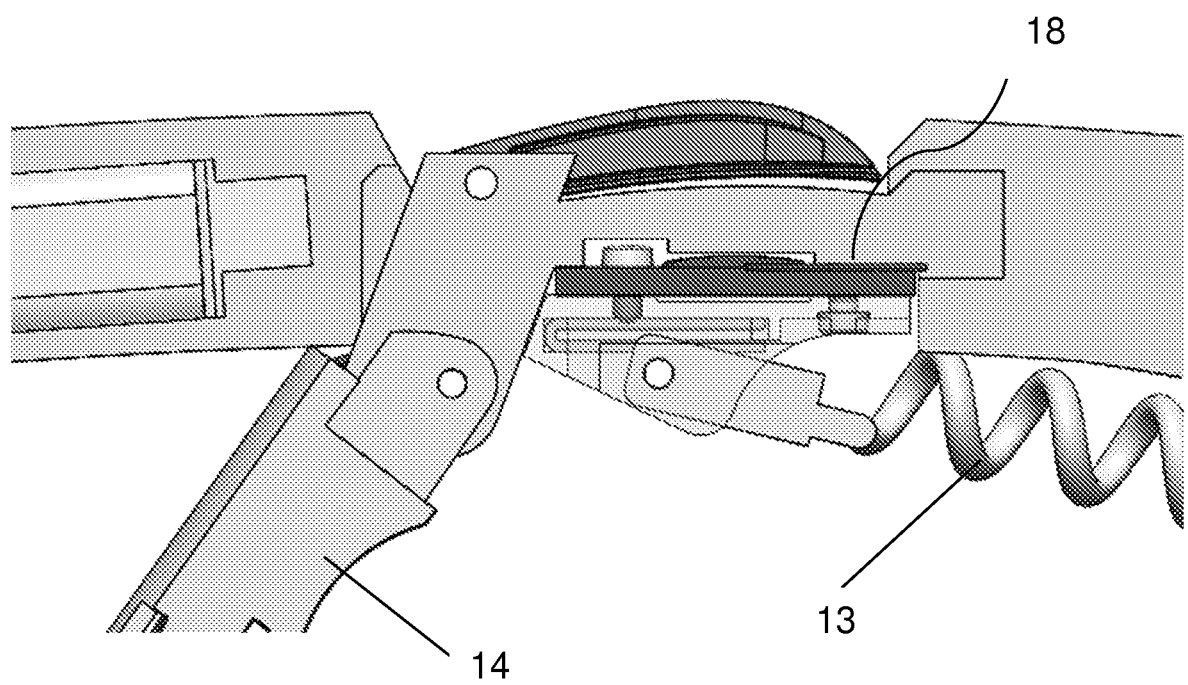

CORKSCREW WITH CONFIRMATION OF OPENING OF AN AUTHENTICATED BOTTLE

CROSS-REFERENCE TO RELATED APPLICATIONS

This application is a National Stage of International Application No. PCT/FR2020/051490, having an International Filing Date of 20 Aug. 2020, which designated the United States of America, and which International Application was published under PCT Article 21(2) as WO Publication No. 2021/032932 A1, which claims priority from and the benefit of French Patent Application No. 1909316, filed on 21 Aug. 2019, the disclosures of which are incorporated herein by reference in their entireties.

BACKGROUND

Field

The present disclosure relates to a corkscrew and, more specifically, a corkscrew capable of guaranteeing the effective opening of a bottle comprising a blocking stopper.

It relates also to such a corkscrew capable of authenticating the bottle that is intended to be opened and, consequently, capable of authorizing the management of the status of this bottle in a database.

It relates also to a base for this corkscrew, notably for powering its battery.

BRIEF DESCRIPTION OF RELATED DEVELOPMENTS

In the field of wines and spirits, it is known practice to use so-called antitamper devices, the aim of which is to guarantee the authenticity of the liquid contained in a bottle.

Such devices aim to dissuade forgers from reusing containers that have contained quality products, by filling them with products of lesser quality, to mislead the end consumer.

As an example, caps are known that are intended to cover and hold captive the blocking means of a bottle, and that are provided with a unique identification element such as several invisible symbols that can be revealed only in ultraviolet light, or even labels implementing a contactless identification solution of the radiofrequency (RFID) type.

It is then known that the latter comprises a unique identifier of the bottle which can be read by a contactless reading device, when such a label is placed within the coverage zone thereof.

These elements are typically intended to be destroyed upon the first attempt to open a bottle, to indicate to the end consumer that the bottle that he or she is holding has or has not been opened or tried to be opened.

However, such a method for protecting the content of a bottle still lends itself to improvement.

First of all, such a security device can be modified irreversibly without the bottle having actually been opened, that is to say without the stopper blocking the neck thereof having been extracted to access the content of the bottle.

Moreover, an ill-intentioned person can replace such a security device with his or her own identification element.

Furthermore, such a security device, although uniquely linked with the bottle to which it is affixed, constitutes a simple opening telltale device and possibly also allows the authentication of this bottle. However, it is limited only to these functions and, to the best knowledge of the present applicant, ensures no others.

Now, it is well known that the management of a wine cellar containing a large number of bottles is relatively complex and time-consuming when it involves managing regular additions and removals of several bottles.

In particular, the small gap that exists between two successive rows of a stack of bottles in a wine cellar makes the label adorning the body of each bottle almost invisible. It can therefore prove difficult to search for a particular bottle.

Software packages are known that are specifically developed to assist a wine lover or sommelier in managing a cellar.

However, great rigor is demanded thereof to keep his or her database up to date.

He or she in fact needs to perform various tedious operations in order to ensure that the removal of a bottle from his or her cellar is duly listed.

It is therefore commonplace, when seeking to consume one or more bottles of a particular win, for the owner of a wine cellar to find, with chagrin, that they are absent and have not been replaced.

It is, moreover, well known that the opening of a bottle essentially involves the use of a corkscrew, stoppers made of cork still being widely used, notably in France.

Cork is, in fact, demonstrated to be ideal for the conservation of quality wine, in particular the grands crus.

Various types of corkscrew exist. However, these corkscrews, more or less complex in their use, fulfill only a single function, namely allowing the extraction of a stopper.

So, it would be advantageous to have a corkscrew, the original design of which allows the abovementioned drawbacks to be overcome.

SUMMARY

The present disclosure targets a corkscrew that is simple in its design and in how it is used, that is reliable, that makes it possible to guarantee the effective opening of a bottle comprising a blocking stopper.

One subject of the present disclosure is such a corkscrew configured to authenticate the bottle that is intended to be opened and that thereby allows a particularly easy and rapid management of the status of this bottle in a database.

Another subject of the present disclosure is such a corkscrew, one that is energy-independent and in which the management of the battery is controlled to optimize its battery-life.

It relates also to a base for this corkscrew, notably for powering its battery.

To this end, the present disclosure relates to a corkscrew.

According to the present disclosure, this corkscrew comprises a detection assembly configured to detect the extraction of a stopper from the neck of a bottle and thus guarantee effective opening of said bottle.

Purely illustratively, the body of this corkscrew can comprise one or more internal recesses in which all or part of the detection assembly is housed.

Advantageously, the present corkscrew makes it possible, upon the extraction of a stopper blocking a container, to generate simple and reliable information concerning the effective or non-effective opening of this container. Consequently, this information can be exploited to update the status of this container in a database and, more widely, offers a particularly simple method for managing a stock of bottles. The automatic replacement of each bottle consumed can consequently be planned.

Note that the present disclosure is not limited to the opening of a bottle blocked by the stopper made of cork but, on the contrary, it addresses all types of stoppers, for example crown caps.

In the latter case, the corkscrew will include a crown cap removal lug, or a hook intended to engage against the bottom surface of a crown cap.

In various particular embodiments of this corkscrew, each having its own advantages that also lend themselves to numerous technically possible combinations:

said detection assembly comprises a motion sensor for detecting the displacement of at least a part of the corkscrew.

Preferably, this motion sensor is an accelerometer.

said detection assembly comprises a pressure sensor for detecting the force applied to the corkscrew upon the extraction of said stopper.

Advantageously, the force sensor allows a measurement of the force applied by the user to the corkscrew in order to pull the stopper out of the neck of a bottle, while the accelerometer notably makes it possible to detect a displacement of the stopper in the neck and, even better, the acceleration of the corkscrew, or a peak, caused by the removal of the stopper from the neck of this bottle. This information combined together makes it possible to guarantee the effective opening of a bottle.

As an example, the value of the force applied by a user to the corkscrew to extract a stopper out of the neck of a bottle, can be compared to one or more reference values, such that the comparison between the measured value and this reference value or values provides evidence of the pulling of the stopper by this corkscrew.

said detection assembly comprises a rotation sensor for detecting the depression of the worm screw, or twist, of the corkscrew into said stopper.

Such information can be exploited by the central processing unit of the corkscrew managing the detection assembly to prepare and trigger the measurements of acceleration of the corkscrew and of applied force so as to limit the energy consumption of the battery of the corkscrew. For example, the motion sensor and the pressure sensor can be placed by default in sleep mode and woken up by the central processing unit of the corkscrew when measurements have to be performed with these sensors. Alternatively, the deployment of a constituent element of the corkscrew, such as displacement of the twist between its non-deployed and deployed positions, the non-deployed position corresponding to a configuration of the twist in which it is received in the body of the corkscrew to be concealed, can for example be detected by a position sensor, the signal sent by this position sensor to the central processing unit of the corkscrew when the twist is entirely deployed being exploited, by the central processing unit, to ensure that the various sensors are woken up.

Preferably, the rotation sensor is a gyroscope.

Advantageously, this gyroscope placed on the axis of the twist of the corkscrew makes it possible to measure the total angle covered by the corkscrew driven in rotation to screw the twist into the stopper. That amounts also to determining the number of turns of the corkscrew performed to screw the twist into the stopper of the bottle.

As an example, if this measured total angle reaches 1440°+/−200°, i.e. between three and a half turns and four and a half turns, it can be considered that the twist of the corkscrew has indeed been depressed into the stopper of the bottle.

Consequently, and according to the present disclosure, the total angle, or the number of turns performed by the corkscrew upon the insertion of the twist into the stopper of the bottle, is determined. When this total angle, or this number of turns, is greater than a previously defined threshold value such as 1440°+/−200°, it is deduced therefrom that the twist of the corkscrew has indeed been inserted into the stopper for it to be extracted.

said bottle comprising a security device for authenticating said bottle, said corkscrew comprises at least one sensor configured to read the identification data of the security device of the sole corresponding bottle.

Advantageously, said at least one sensor is chosen from the group comprising:

a reader configured to detect and wirelessly read a security device situated within the coverage range of this reader, a reader comprising an integrated or external reading or reading and writing RFID module, a reader comprising a near-field reading module (NFC—Near Field Communication), an image capture device for capturing an image comprising a unique signature of said stopper.

In the latter case, said detection assembly can for example comprise a UV source for illuminating an identification zone of the security device, said image capture device making it possible to image, or display, this zone, said detection assembly then comprising a microprocessor for executing the steps of an analysis software package so as to detect, in the image or the images acquired by this image capture device, one or more symbols that are only visible under UV light in order to uniquely identify said associated bottle.

Alternatively, this detection assembly can comprise a source for illuminating an identification zone of the security device or a blocking stopper from a given angle such as tangentially, acquiring one or more images of this zone or of this stopper thus illuminated with said image capture device, and comparing the image or images thus acquired with images previously stored in memory to uniquely identify this identification zone or this stopper.

this corkscrew comprises a battery notably for powering the various components of the detection assembly.

Preferably, it then comprises a wireless communication modules with low energy consumption, such as a module configured to communicate according to one of the following protocols: Bluetooth, Sigfox, LoRa, THREAD, Wifi HaLow, LiFi or even ZigBee.

The implementation of such a communication protocol makes it possible to transmit data while minimizing the energy consumption of the battery of the corkscrew and therefore to optimize the usage time thereof between two successive recharges.

this corkscrew comprises a handle comprising a twist, or worm screw, intended to be screwed into a stopper depressed into the neck of a bottle.

Preferably, this corkscrew comprises one or more elements chosen from the group comprising a lever, a lever provided with one or more noses, preferably two, capable of bearing on the neck of said bottle or even a handle provided with two extraction blades spaced apart from one another. Alternatively, this corkscrew is a lever corkscrew.

The present disclosure relates also to a base for the corkscrew as described previously.

According to the present disclosure, it comprises a charging base provided with charging terminals for charging the battery of this corkscrew.

According to a particular embodiment of this base, said base comprises a reading module configured to detect and wirelessly read the security devices of a plurality of bottles placed within the coverage range of said reading module. Purely illustratively, this wireless reading module operates by radiofrequency.

This reading module is advantageously an external reading module which is added on and linked to this base to ensure the management thereof. Advantageously, it is an RFID reading module configured to have a coverage extending to a storage zone for bottles, for example a cellar. Such a module then makes it possible to acquire, all at once, all of the security devices of the bottles present within this storage zone for example to take an inventory of these bottles all at once.

According to another particular embodiment of this base, it comprises a storage unit in which are stored data relating at least to the identification of each bottle present within its coverage range, a processing unit and means for accessing said storage unit and writing means for keeping the status of each of these bottles up to date.

According to yet another particular embodiment of this base, it comprises a wireless communication module for communicating with said corkscrew and/or a means of interconnection with said corkscrew such that, the latter being interconnected with said base, a continuity of communication link to ensure exchanges of data is established between said corkscrew and said base.

The communications can be performed by using a local area network, such as a WiFi network, or a cellular access network, possibly of several types (2G, 3G, 4G, 5G), each network type being accessible according to several cellular access technologies (2G: EDGE, GPRS, 3G: UMTS, HSDPA, HSUPA, HSPA, HSPA+, 4G: LTE, 5G).

The present disclosure relates also to a method for managing a wine cellar, wherein the following steps are carried out:
uniquely identifying a bottle, said bottle having a neck blocked by a stopper,
detecting the extraction of the stopper out of the neck of said bottle to guarantee the effective opening of said bottle,
addressing an opening signal concerning said bottle to a mobile processing unit such as a smartphone or to a fixed processing unit to ensure the updating of a database containing information on said duly opened bottle.

According to an embodiment of this management method, the extraction of the stopper is detected by detection of the force applied to the corkscrew to extract said stopper from the neck of said bottle and/or detection of a motion of at least a part of the corkscrew.

Advantageously, a force sensor, or pressure sensor, positioned on the axis of the twist, makes it possible to detect the stopper extraction force. Advantageously, the rotation of the twist of the corkscrew in the stopper is detected to prepare the measurement of speed and/or the measurement of applied force.

Alternatively, the deployment or the movement of a constituent element of the corkscrew, such as the passage of the twist from its non-deployed position to its deployed position for a corkscrew of sommelier or waiter type, can be used to prepare the speed measurement and/or the force measurement.

Preferably, the combination of the information supplied by the detection of the rotation of the twist of the corkscrew in the stopper, of the force applied to the corkscrew to extract the stopper out of the neck of the bottle and of the motion of at least a part of the corkscrew can be used to absolutely guarantee the opening of this bottle.

More generally, the present disclosure relates also to a method for determining the opening of a bottle blocked by a stopper in which the detection of an event link to the corkscrew, such as the opening of the lever of the corkscrew, triggers a data acquisition cycle.

During this data acquisition cycle, the total angle of rotation, or even the number of turns performed by the corkscrew to introduce the twist thereof into the stopper, is measured. Preferably, a security device, such as an RFID label, situated on the neck of the bottle, at a distance from the top end of the neck of the bottle, is also read wirelessly.

When the total angle measured, or even when the number turns of the corkscrew performed to introduce the twist thereof into the stopper is greater than a predetermined threshold value, for example 1440°, or even four complete turns, and preferentially, when the security device placed on the neck is read, it is deduced that the twist of the corkscrew has been effectively introduced into the stopper for it to be extracted. Note that, although preferred, the reading of the security device remains optional. Furthermore, a measurement of the force applied to extract the stopper, for example by means of a force sensor placed on the axis of the twist of the corkscrew, then makes it possible, when this value is greater than a threshold value, to confirm the effective extraction of the corkscrew.

The association of these three data (total rotation angle, reading of a security device and applied force) provides a certain guarantee of the effective extraction of the stopper from the bottle.

The confirmation of the removal of the stopper from a bottle can also be obtained by two measurements (total rotation angle and applied force).

Advantageously, a switch is implemented to ensure the detection of the opening of the lever.

The measurement of the total rotation angle is assured by a gyroscope while the reading of the security device is performed by means of a contactless reading device such as an RFID reader, which is placed preferably on the lever.

The security device is advantageously placed at at least two (2) cm from the top end of the neck of the bottle. The reading thereof then makes it possible to affirm that the corkscrew has come close to the neck upon the insertion of the twist into the stopper.

BRIEF DESCRIPTION OF THE DRAWINGS

Other advantages, aims and particular features of the present disclosure will emerge from the following description, given for explanatory purposes and not limiting, in light of the attached drawings, in which:

FIG. 1 is a schematic representation of a corkscrew, according to a first embodiment of the present disclosure;

FIG. 2 is a schematic representation of the main steps taken in the management of a bottle according to an embodiment of the method of the present disclosure;

FIG. 3 is a schematic representation of a corkscrew, according to a second embodiment of the present disclosure;

FIG. 4 is a schematic representation of a corkscrew, according to a third embodiment of the present disclosure;

FIG. 5 is a schematic representation of a corkscrew, according to a fourth embodiment of the present disclosure;

FIG. 6 is an enlarged view of a corkscrew, according to a fifth embodiment of the present disclosure;

DETAILED DESCRIPTION

The drawings and the description hereinbelow contain, for the most part, elements of a certain nature. They will therefore be able not only to serve to better understand the present disclosure, but also contribute to the definition thereof, if necessary.

First of all, note that the figures are not to scale.

FIG. 1 schematically represents a corkscrew 10 for extracting a stopper blocking the neck of a bottle, according to a particular embodiment of the present disclosure.

This corkscrew 10, which is of the waiter's corkscrew type, comprises a handle comprising two plates 11 spaced apart from one another and joined together to define a recess (not represented). Each plate 11 comprises a substantially parallelepipedal main part, a protuberance 12 extending this main part in its lower part. As a purely illustrative example, these plates 11 are made of metal but they could also be made of plastic material or even of wood.

A twist 13 is mounted on the handle about a pivoting axis so as to be movable between a deployed position in which it protrudes out of the handle and a non-deployed position in which it is received in a recess defined between the two plates 11 of the handle of this corkscrew 10.

This corkscrew 10 also comprises a lever 14 mounted to pivot at an end of the handle, this lever 14 having, at its free end, a nose arranged to bear on the neck of the bottle during the extraction of the stopper.

This lever 14 also comprises an RFID reading device (not represented) for reading a security device composed of an RFID label affixed onto the neck of the bottle. It is known that such a label comprises a unique identifier associated with this bottle to allow the authentication thereof.

An abutment 15 placed on the handle of the corkscrew 10 makes it possible to limit the amplitude of displacement of the lever 14 so as to ensure that the coverage zone of the RFID reading device spatially covers the neck of the bottle to be opened to be able to read the security device upon the introduction of the twist 13 into the stopper.

A knife blade 16 is also mounted to pivot on the handle. In its stowed position, it is housed between the two plates 11 of the handle while protruding slightly therefrom so as to be able to be grasped by the user for it to be manipulated.

The handle also incorporates a detection assembly, which is placed in the recess defined by the plates 11 of the handle. Advantageously, this detection assembly comprises a motion detection unit comprising an accelerometer 17 for detecting a motion of the corkscrew 10, notably an acceleration caused by the removal of the stopper out of the neck of the bottle, and a gyroscope for detecting the depression of the worm screw, or twist, of the corkscrew into the stopper. This detection assembly also comprises a pressure sensor 18 for detecting the force applied to the corkscrew 10 by the user during the extraction of this stopper.

With such information, a central processing unit (not represented), such as a microprocessor, of this detection assembly, integrated or not in the handle, is able to detect the extraction of the stopper from the neck and to thus guarantee the effective opening of the bottle.

Alternatively, this detection unit 17 could be a miniature inertial unit of MEMS (microsystems) type.

The handle of the corkscrew 10 also incorporates a battery 19 for supplying energy to the various sensors of the corkscrew 10.

FIG. 2 schematically represents the main steps of a method for managing a bottle blocked by a stopper by the use of the above illustrated corkscrew 10, according to a particular embodiment of the present disclosure.

According to this method, this bottle is uniquely identified 20 by means of an RFID reading device of the corkscrew 10 and of an RFID label placed on this bottle, this label comprising a unique identifier of said bottle. For that, it is made sure that the coverage zone of this RFID reading device covers the RFID label.

The stopper of this bottle is extracted in a conventional way by the engagement of the twist 13 of the corkscrew 10 in the stopper and the application of a force, or an effort, on the corkscrew 10 to pull the stopper out of the neck of the bottle.

Simultaneously, the acceleration 21 of the corkscrew 10 caused by the extraction of the stopper out of the neck of the bottle is measured, and the force 22 applied by the user to ensure this extraction is measured, such that these two pieces of information combined allow the central processing unit to guarantee the effective opening of this bottle.

An opening signal concerning the bottle is then addressed 23 by the central processing unit of the corkscrew 10 via a communication interface (not represented) to a mobile processing unit such as a smartphone, to ensure the updating of the database stored in this smartphone, this base containing information on the duly opened bottle.

FIGS. 3 to 6 give other embodiments of the corkscrew of the present disclosure.

The elements represented in FIGS. 3 to 6 and bearing the same references as those illustrated in FIG. 1, represent the same objects, which will not be described again hereinbelow.

The corkscrew of FIG. 3 is a so-called "Charles de Gaulle" lever corkscrew, whereas that of FIG. 4 is a horizontal lever corkscrew of "screwpull" type. The corkscrew of FIG. 5 is a twin prong corkscrew. Each of these corkscrews comprises an RFID reading device 24 for reading a security device placed on the bottle to be opened in order to guarantee the authenticity thereof and ensure, by means of the unique identifier associated with that bottle, the management thereof in a database.

The corkscrew of FIG. 6 comprises a force sensor on the axis of the twist which makes it possible to detect the stopper extraction force.

What is claimed is:

1. A corkscrew, characterized in that it comprises a detection assembly configured to detect the extraction of a stopper from the neck of a bottle and thus guarantee the effective opening of said bottle, said bottle comprising a security device for authenticating said bottle, said corkscrew comprises at least one sensor configured to read the identification data of the security device of the sole corresponding bottle.

2. The corkscrew as claimed in claim 1, characterized in that said detection assembly comprises a motion sensor for detecting the displacement of at least a part of the corkscrew.

3. The corkscrew as claimed in claim 1, characterized in that it comprises a pressure sensor for detecting the force applied to the corkscrew upon the extraction of said stopper.

4. The corkscrew as claimed in claim 1, characterized in that said detection assembly comprises a rotation sensor for detecting the depression of the worm screw, or twist of said corkscrew into said stopper.

5. The corkscrew as claimed in claim 4, characterized in that said rotation sensor is a gyroscope.

6. The corkscrew as claimed in claim 1, characterized in that said at least one sensor is chosen from the group comprising:
- a reader configured to detect and wirelessly read a security device situated within the coverage range of this reader,
- a reader comprising an integrated or external reading or reading and writing RFID module,
- a reader comprising a near-field reading module,
- an image capture device for capturing an image comprising a unique signature of said stopper.

7. The corkscrew as claimed in claim 1, characterized in that it comprises a battery and a wireless communication module with low energy consumption.

8. The corkscrew as claimed in claim 1, characterized in that it comprises one or more levers, a lever provided with one or more noses capable of bearing on the neck of said bottle or even a handle provided with two extraction blades spaced apart from one another.

9. A base for the corkscrew as claimed in claim 1, characterized in that it comprises a charging base provided with charging terminals for charging the battery of said corkscrew.

10. The base as claimed in claim 9, characterized in that said base comprises a reading module configured to detect and wirelessly read the security devices of a plurality of bottles placed within the coverage range of said reading module, a storage unit in which are stored data relating at least to the identification of each bottle present within its coverage range, a processing unit and means for accessing said storage unit and writing means for keeping the status of each of these bottles up to date.

11. A method for managing a wine cellar, wherein the following steps are carried out:
- uniquely identifying a bottle, whose neck is blocked by a stopper, by means of a corkscrew as claimed in claim 1,
- detecting the extraction of the stopper out of the neck of said bottle to guarantee the effective opening of said bottle,
- addressing an opening signal concerning said bottle to a mobile processing unit such as a smartphone or to a fixed processing unit to ensure the updating of a database containing information on said duly opened bottle.

12. The method as claimed in claim 11, characterized in that the extraction of the stopper is detected by detection of the force applied to the corkscrew to extract said stopper from the neck of said bottle and/or detection of a motion of at least a part of the corkscrew.

13. The method as claimed in claim 12, characterized in that the rotation of the twist of the corkscrew in the stopper is detected to prepare the measurements of speed and of applied force.

14. A method for determining the opening of a bottle, characterized in that the detection of an event linked to the corkscrew triggers a data acquisition cycle, during which the following steps are performed by means of this corkscrew:
- measuring the total angle of rotation, or even the number of turns performed by said corkscrew to introduce the twist thereof into the stopper of the bottle, then comparing the value obtained to a predetermined threshold value,
- preferably, wirelessly reading a security device placed on the neck of the bottle by means of the corkscrew, and
- measuring the force applied to extract the stopper by means of a force sensor placed on said corkscrew.

\* \* \* \* \*